(12) United States Patent
Carpenter

(10) Patent No.: US 8,028,876 B2
(45) Date of Patent: Oct. 4, 2011

(54) GLOVEBOX COVER FOR A MOTORCYCLE

(76) Inventor: James Carpenter, Shawnee, KS (US)

(*) Notice: Subject to any disclaimer, the term of this patent is extended or adjusted under 35 U.S.C. 154(b) by 488 days.

(21) Appl. No.: 11/804,751

(22) Filed: May 18, 2007

(65) Prior Publication Data
US 2009/0033117 A1 Feb. 5, 2009

(51) Int. Cl.
B62J 11/00 (2006.01)

(52) U.S. Cl. ........ 224/414; 224/413; 224/419; 224/434; 224/926

(58) Field of Classification Search .......... 224/413–414, 224/419, 434, 457, 926; 220/210; 49/492.1
See application file for complete search history.

(56) References Cited

U.S. PATENT DOCUMENTS

| 1,044,383 | A | * | 11/1912 | Hatch | 160/128 |
|---|---|---|---|---|---|
| 1,137,583 | A | * | 4/1915 | Cox | 248/311.2 |
| 1,288,190 | A | * | 12/1918 | Ravn | 220/491 |
| 1,565,843 | A | * | 12/1925 | Barnes | 165/135 |
| 2,518,538 | A | * | 8/1950 | Giblin | 219/526 |
| 3,204,903 | A | * | 9/1965 | Stoddard | 248/117.6 |
| 3,734,439 | A | * | 5/1973 | Wintz | 248/224.51 |
| 4,040,549 | A | * | 8/1977 | Sadler | 224/483 |
| 4,127,211 | A | * | 11/1978 | Zerbey | 220/212 |
| 4,260,085 | A | * | 4/1981 | Jefferson | 224/414 |
| 4,324,381 | A | * | 4/1982 | Morris | 248/311.2 |
| 4,365,723 | A | * | 12/1982 | Palermo et al. | 220/3.8 |
| D282,323 | S | * | 1/1986 | Fetty | D7/601 |
| 4,589,709 | A | * | 5/1986 | Bond et al. | 312/265.6 |
| 4,754,902 | A | * | 7/1988 | Opfergelt | 224/414 |
| 4,979,657 | A | * | 12/1990 | Espiritu | 224/549 |
| 5,106,046 | A | * | 4/1992 | Rowles et al. | 248/311.2 |
| 5,255,811 | A | * | 10/1993 | Simon | 119/265 |
| 5,722,574 | A | * | 3/1998 | Pratt | 224/148.4 |
| 5,782,448 | A | * | 7/1998 | Withun et al. | 248/311.2 |
| 5,915,776 | A | * | 6/1999 | Bieri | 296/37.12 |
| 5,938,160 | A | * | 8/1999 | Hartmann et al. | 248/311.2 |
| 6,354,476 | B1 | * | 3/2002 | Alderman | 224/413 |
| 6,364,096 | B1 | * | 4/2002 | De Baets et al. | 206/1.5 |
| 6,682,115 | B1 | * | 1/2004 | Tiesler | 296/37.1 |
| 7,097,082 | B2 | * | 8/2006 | Wallaker | 224/483 |
| 7,216,913 | B1 | * | 5/2007 | Volsey, II | 296/37.12 |
| 7,290,832 | B2 | * | 11/2007 | Hanagan | 297/188.07 |
| D563,732 | S | * | 3/2008 | Goodman et al. | D7/624.1 |
| D573,011 | S | * | 7/2008 | Decker et al. | D8/380 |
| 7,494,172 | B2 | * | 2/2009 | Herterich et al. | 296/37.8 |
| D589,873 | S | * | 4/2009 | Banks | D12/411 |
| 7,588,652 | B2 | * | 9/2009 | Repp et al. | 156/108 |
| D604,224 | S | * | 11/2009 | Carpenter | D12/411 |
| 2002/0121534 | A1 | * | 9/2002 | Hanagan | 224/423 |
| 2004/0104255 | A1 | * | 6/2004 | Trautman | 224/413 |

* cited by examiner

Primary Examiner — Justin Larson
Assistant Examiner — John Cogill
(74) Attorney, Agent, or Firm — Adam S. Langley

(57) ABSTRACT

A lockable glovebox cover unit is configured for mating engagement with a frame mounted on a motorcycle. The unit includes a rigid cover element presenting a front and back. Portions of the back extend outward. A locking apparatus is received through the cover and includes a rotatable latch on the back of the cover element. When the latch is placed in the locked position access to the interior of the glovebox is not possible.

A keyhole is formed on the front of the cover element for access to the interior of the glovebox. Additionally, the cover unit may also be removed from the frame when unlocked.

The cover element is preferably made of a synthetic resin. In particularly preferred embodiments the cover unit includes a metal flange affixed to lower portions on the back of the cover. The flange is adapted for mating, gripping engagement to the frame.

4 Claims, 10 Drawing Sheets

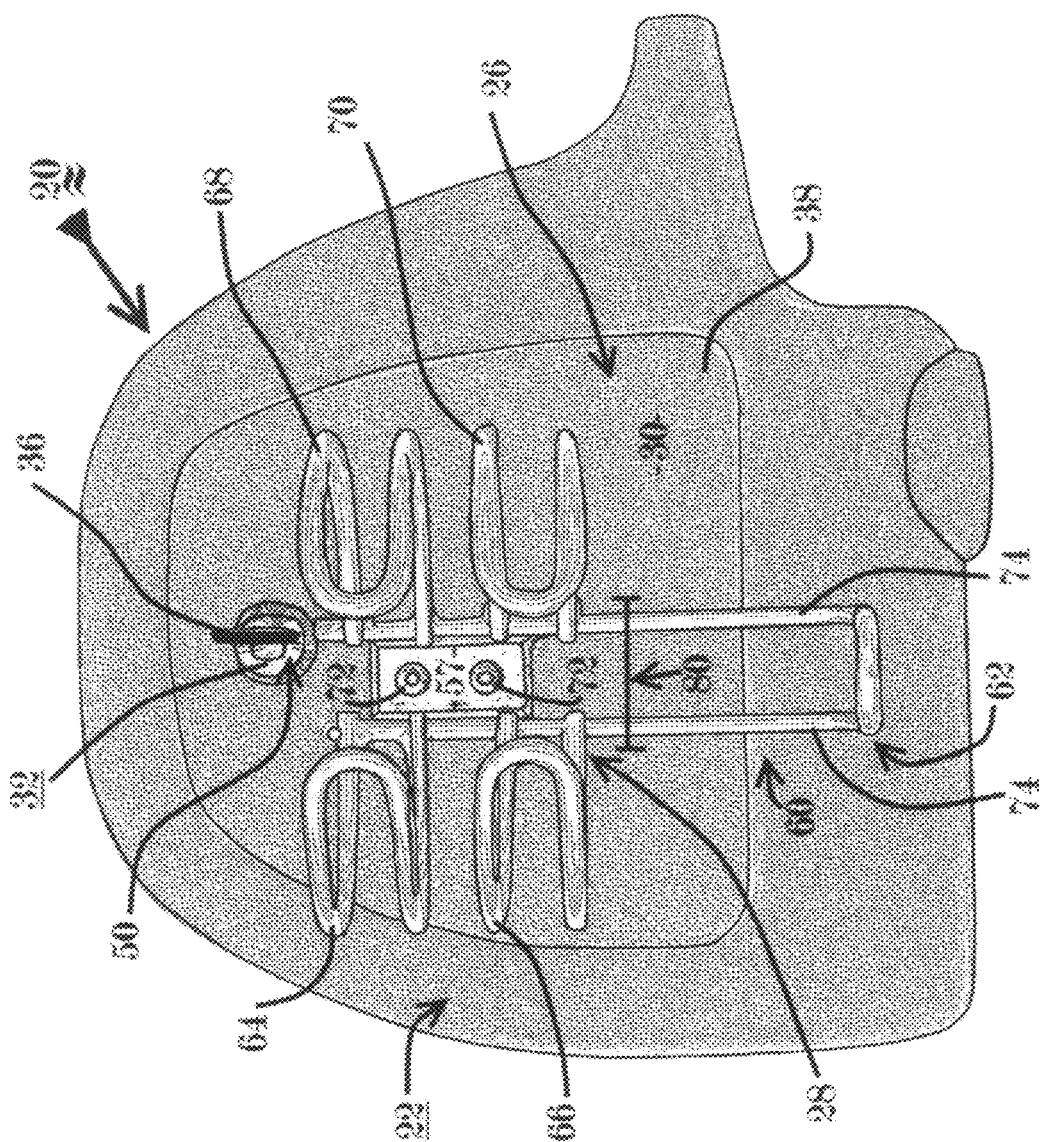

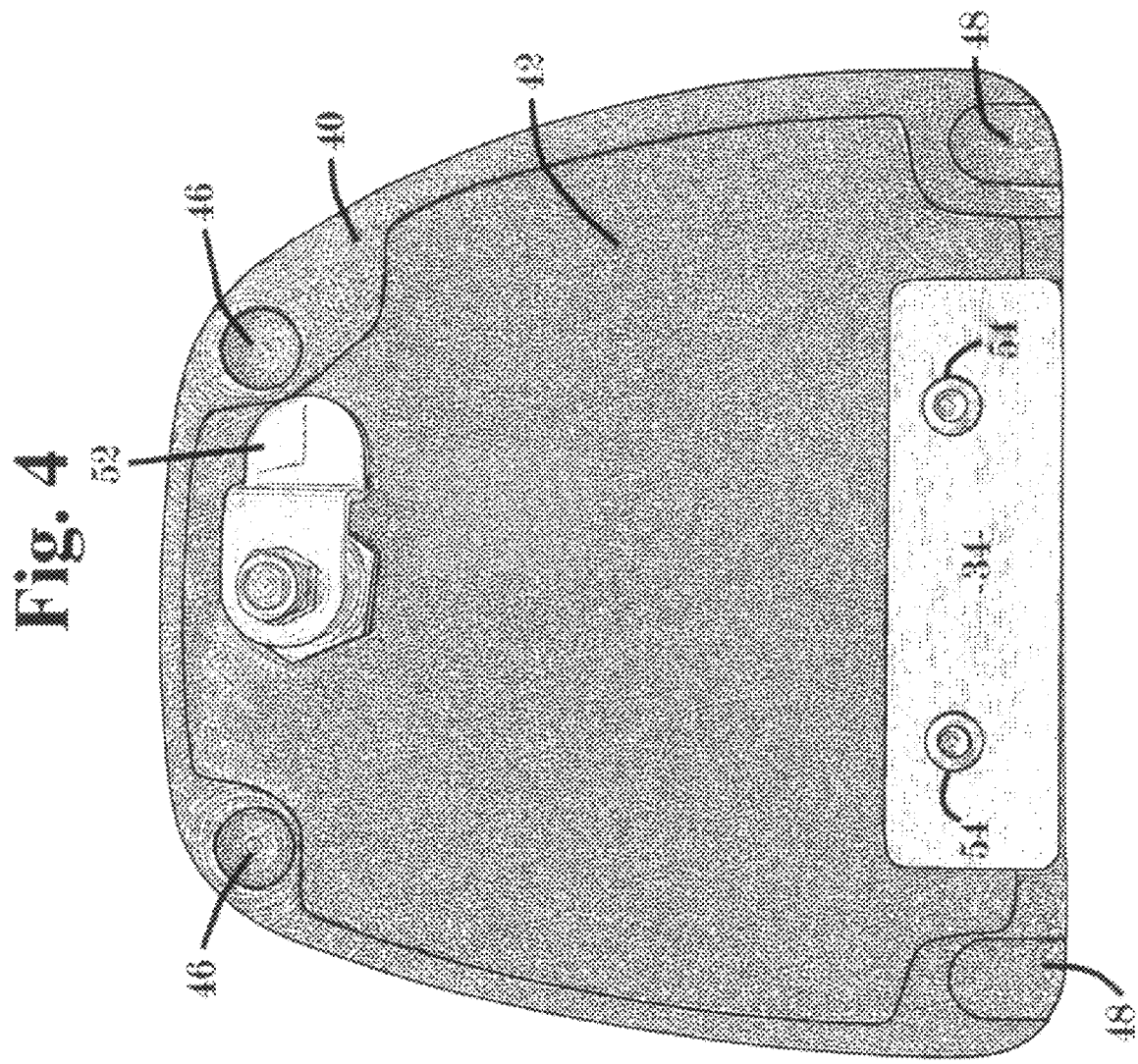

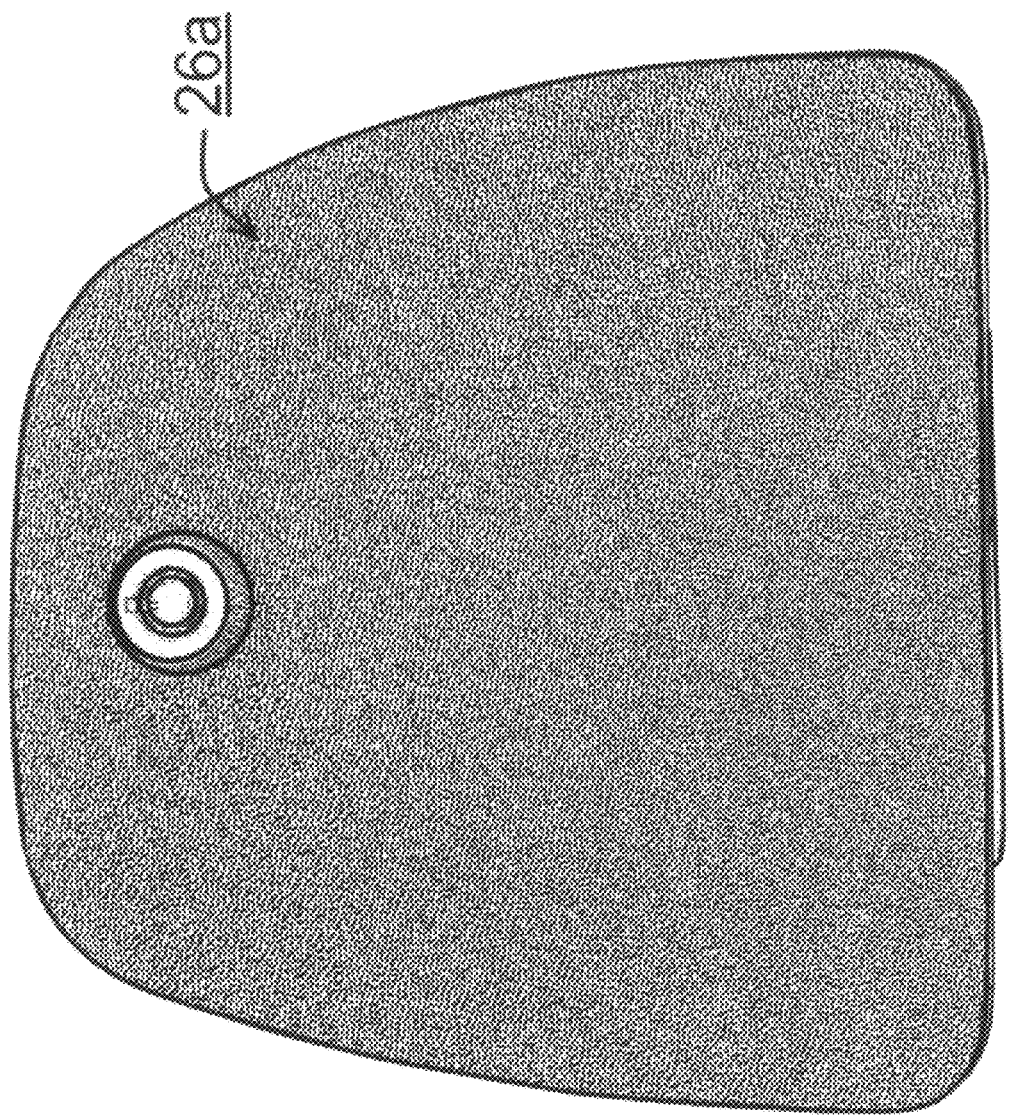

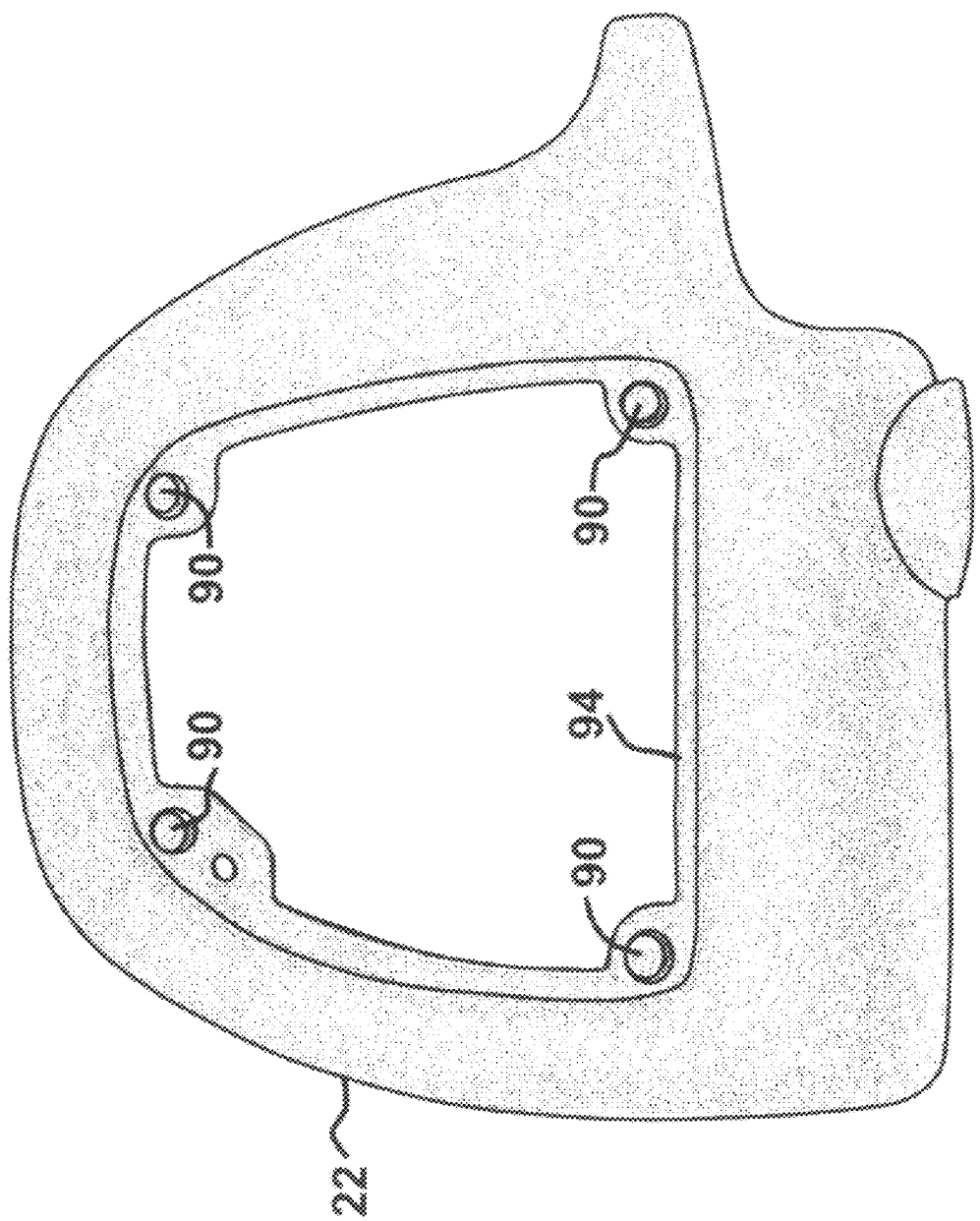

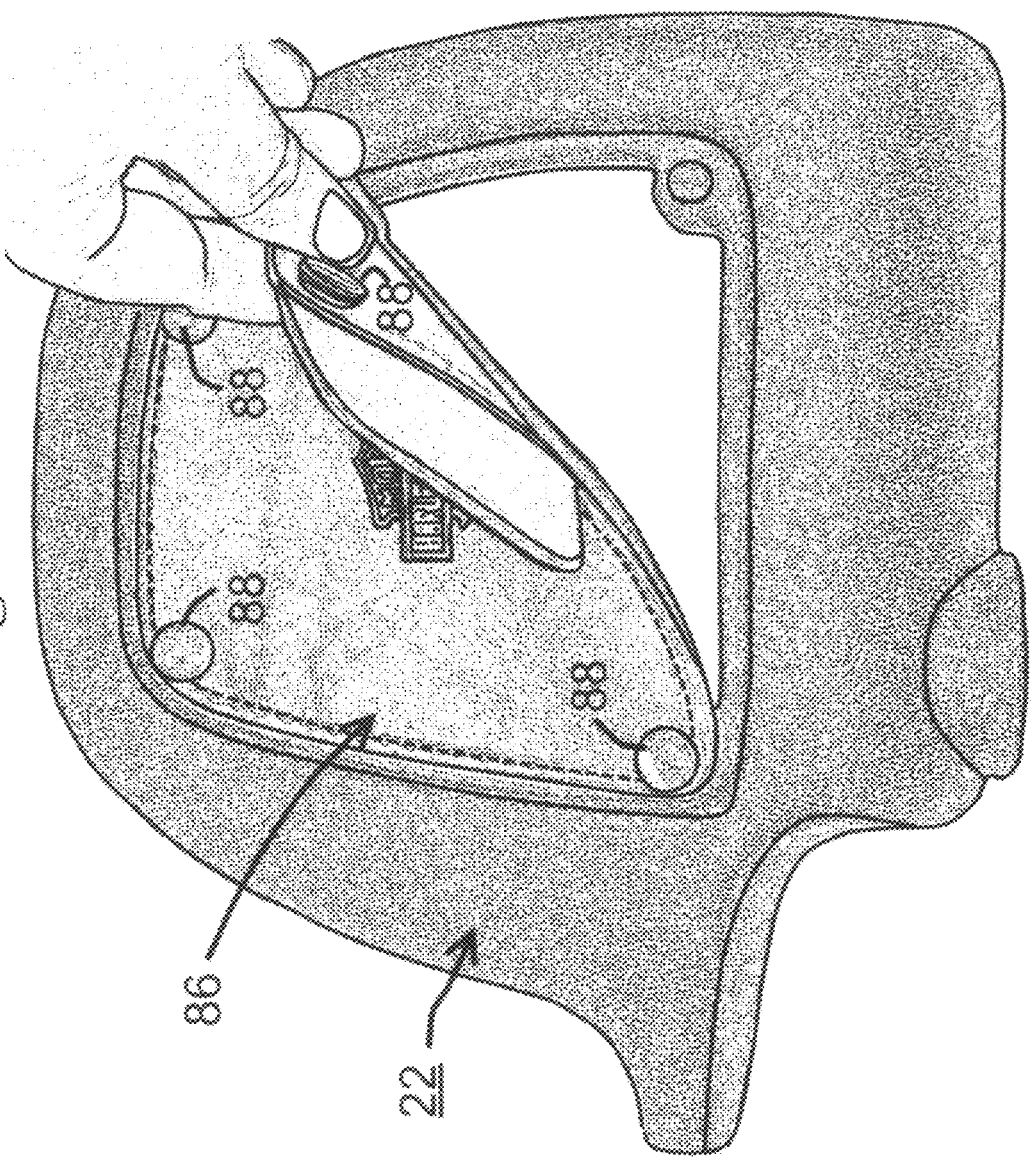

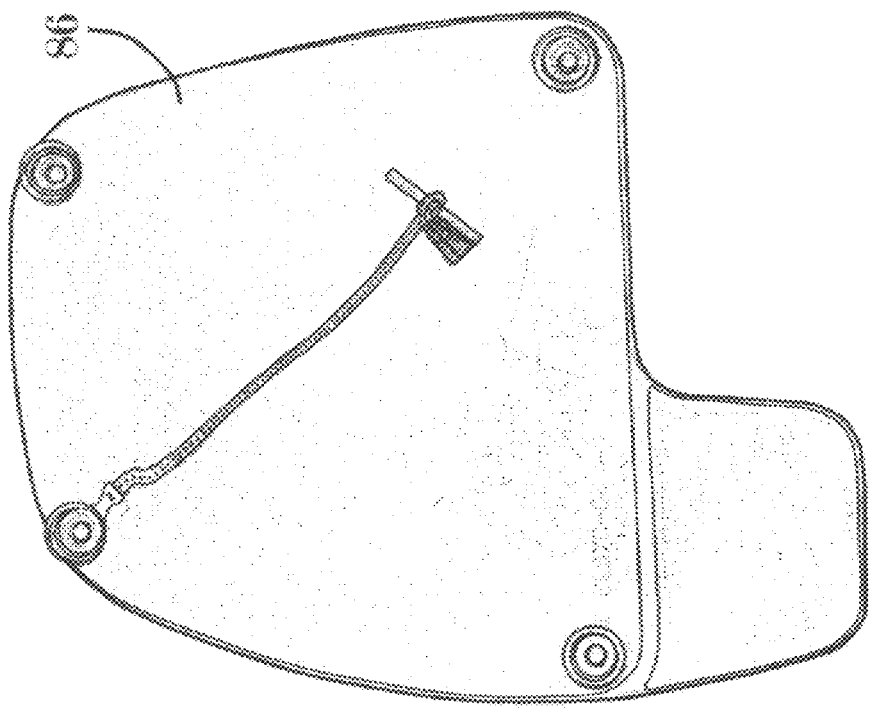
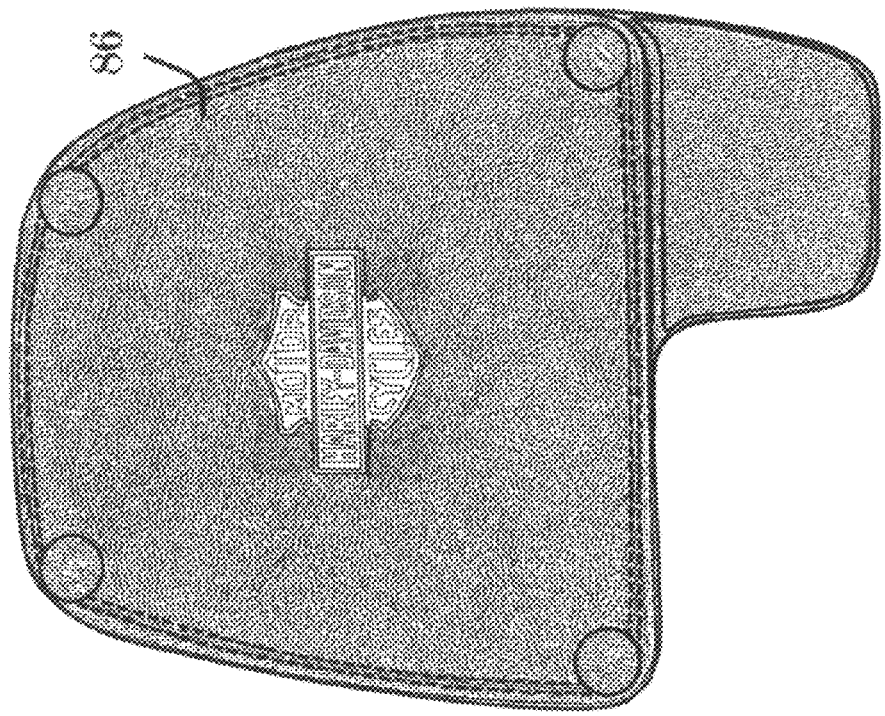

GLOVEBOX COVER FOR A MOTORCYCLE

BACKGROUND OF THE INVENTION

1. Field of the Invention

The present invention relates to a glovebox cover for a motorcycle. More particularly, it is directed to glovebox cover which is rigid, lockable and easily installed.

2. Description of Related Art

Motorcycle riding is very popular around the world. Accessories for motorcycles have become a growing industry as owners seek to personalize their riding experience.

Some standard models, for example, the Harley Davidson Electra-Glide Ultra Classic, come equipped with a glovebox, including a leather cover. The problem is that this cover is not lockable. The cover is simply snapped onto the glovebox frame. Undesirably, this means that the contents of the glovebox are accessible for theft when the motorcycle is unattended.

What is needed is a rigid, lockable and easily installed glovebox cover to replace the manufacturer's cover, so that the glovebox may be secured when unattended.

SUMMARY OF THE INVENTION

The present invention solves the problems of the prior art by providing an easily installable, yet lockable glovebox cover unit for a motorcycle. The cover unit is configured for mating engagement with a glovebox frame mounted on the motorcycle. The glovebox cover unit includes a rigid cover element presenting a front and back. Portions of the back extend outward. A locking apparatus is received through the cover and includes a rotatable latch on the back of the cover element. When the latch is placed in the locked position with respect to the frame, access to the interior of the glovebox is not possible, thus securing any articles inside from theft.

A keyhole is formed on the front of the cover element. When the key is inserted into the keyhole and suitably rotated, the latch is rotated and the cover may be opened for access to the interior of the glovebox. Additionally, the cover unit may also be completely removed from the frame when unlocked, if desired.

The cover element is preferably made of a rigid, durable material such as a metal or a synthetic resin. In particularly preferred embodiments the cover unit includes a metal flange affixed to lower portions on the back of the cover. The flange is adapted for mating, gripping engagement to the frame.

Optionally, an inventive cup holder may be affixed to the front of the cover unit below the keyhole.

BRIEF DESCRIPTION OF THE DRAWINGS

FIG. 3 is a front view of the assembly installed on the glovebox frame with a key in locked mode;

FIG. 4 is rear view of the cover unit;

FIG. 9 is a front view of the cover unit;

FIG. 10 is a front view of the frame;

FIG. 11 is a front view of the prior art glovebox cover, partially opened and mounted on the glovebox frame;

FIG. 12 is a front view of the prior art cover; and

FIG. 13 is a back view of the prior art cover.

DETAILED DESCRIPTION

Figure 1:
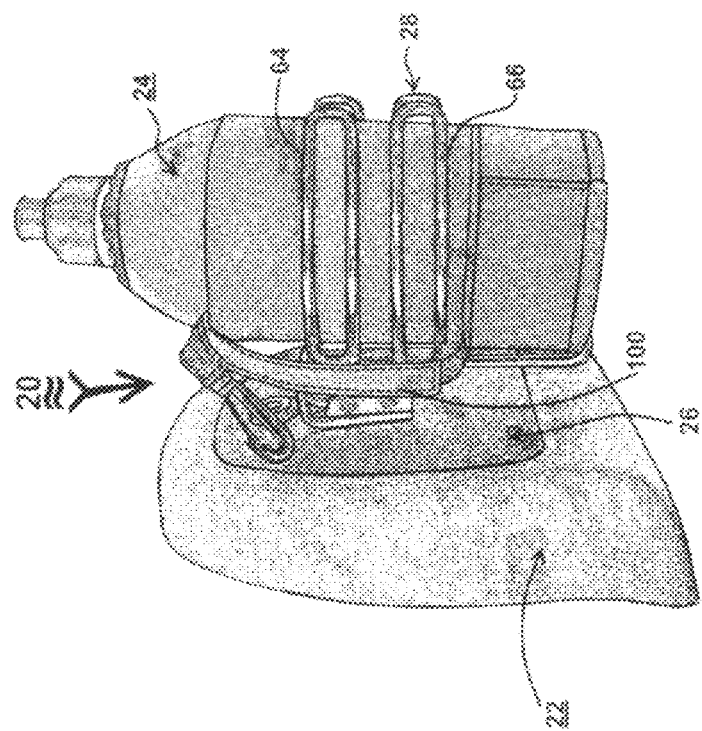
FIG. 1 is a perspective view of the inventive glovebox cover assembly installed on a glovebox frame and supporting a drinking bottle.

Referring to the drawings in general and FIG. 1 in particular a glovebox cover assembly 20 is shown installed on a glovebox, frame 22 along with a drinking bottle 24. Frame 22 is mounted a motorcycle (not shown). Glovebox assembly 20 has a cover unit 26 and a cup holder 28. Referring to FIG. 3, assembly 20 is shown frontally mounted on frame 22. Cover unit 26 has a cover element 30, a barrel key locking apparatus 32 and a flange 34 (see FIG. 4). Also shown is key 36.

Cover element 30 has a front 38 and a back 40 (see FIG. 4). Cover element 30 is rigid and preferably made of a synthetic resin. In particularly preferred embodiments cover element 30 is made for mating engagement with frame 22 for the following Harley Davidson model: Electra-Glide Ultra Classic.

Figure 5:
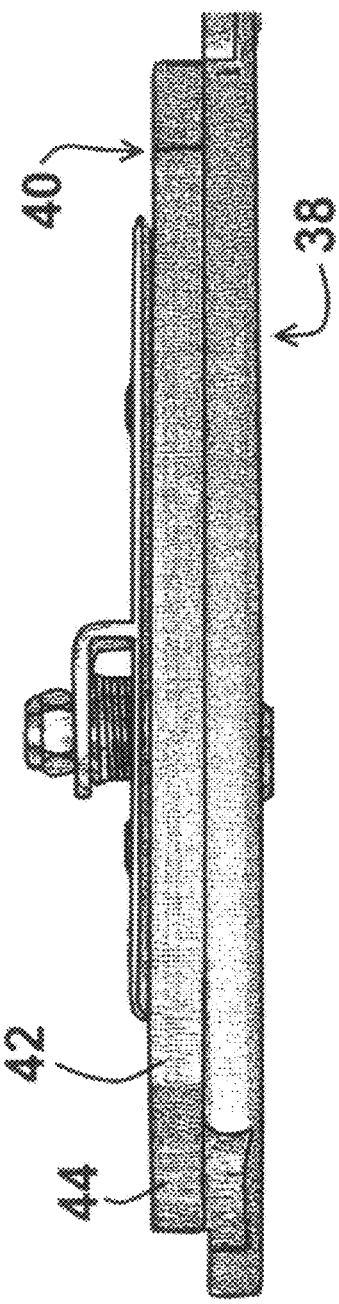
FIG. 5 is a bottom view of the cover unit.

In FIG. 4, portions 42 of the back 40 of cover element 30 (see also FIG. 5 for portions 42). Portions 42 of back 40 include a lower region 44 (see FIG. 5).

Referring again to FIG. 4, cover element 30 includes upper invaginations 46 and lower invaginations 48.

Referring to FIG. 3, locking apparatus 32 includes a keyhole 50. As well as a rotatable latch 52 (see FIG. 4).

Figure 6:
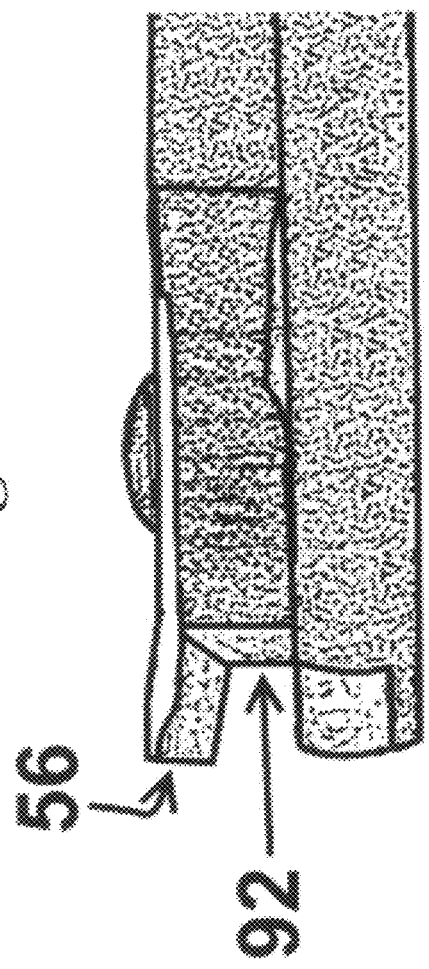
FIG. 6 is a detailed, partial side view of lower portions of the cover unit.

Referring to FIG. 4, flange 34 includes two securing bolts 54 and presents an outward taper at the bottom of flange 34 as indicated by reference numeral 56 (see FIG. 6).

Figure 8:
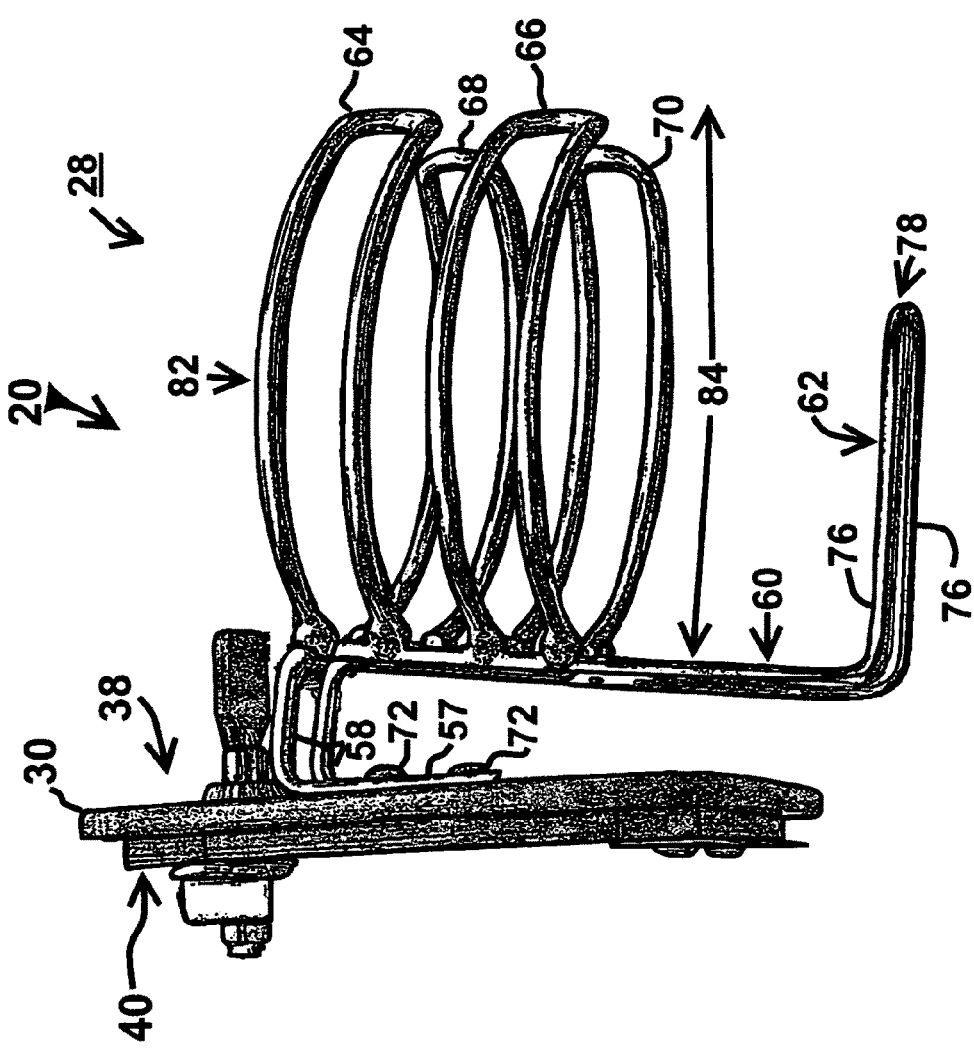
FIG. 8 is a side view of the assembly with key in the unlocked mode.

Referring to FIG. 3, cup holder 28 will now be discussed. Cup holder 28 is preferably made of electro-polished stainless steel. Referring to FIG. 8, cup holder 28 includes a base 57, two connector elements 58, a backrest 60, a floor 62 and four ribs 64-70.

Referring to FIG. 3, base 57 is connected to cover unit 26 by base bolts 72. Base 57 is attached below keyhole 50 as shown.

Referring to FIG. 8, connector elements 58 extend outwardly from the front 38 of cover element 30 as shown.

Referring to FIG. 3, backrest 60 includes two backrest elements 74 extending respectively downward from connector elements 58.

Referring to FIG. 8, floor 62 includes two floor elements 76 which meet in the center as indicated at reference numeral 78.

Referring again to FIG. 3, left upper rib 64, left lower rib 66, right upper rib 68 and right lower rib 70 are shown connected to backrest 60. Ribs 64-70 together form an opening span as indicated at reference numeral 80. In the preferred embodiments, the opening 80 is about 15/16 inches across. The dimension of opening 80 may vary between 1/2" and 3" according to the invention.

Referring to FIG. 8, backrest 60, floor 62 and ribs 64-70 cooperatively form a cylindrical volume 82 as indicated. In preferred embodiments the diameter 84 of cylindrical volume 82 is preferably four inches.

Installation and operation of assembly 20 will now be discussed. Referring to FIG. 11, a prior art leather cover 86 is shown mounted on frame 22. Prior art leather cover 86 has four snaps 88. To remove cover 86 all four snaps are simply disconnected. Note that one snap is shown as already disconnected in FIG. 11. At this stage frame 22 is left uncovered.

Figure 7:
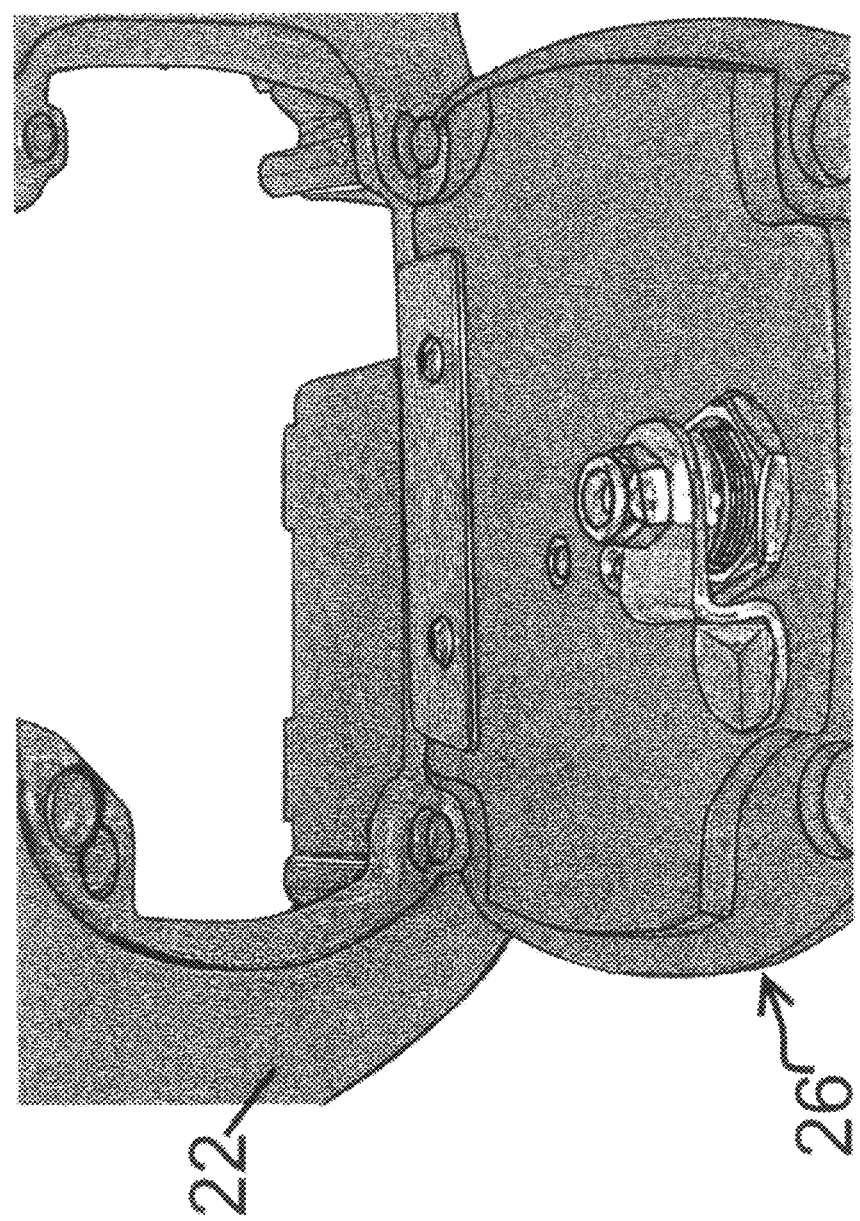
FIG. 7 is a top view of the cover unit unlocked from the frame.

Note that snaps 88 were removed from snap receptors 90. Note also that a symmetrical frame 22 may be mounted on either right or left side of the motorcycle and that the configuration of the inventive cover unit 26 will be adjusted for such symmetry. Referring to FIG. 7, cover unit 26 is then engaged on frame 22 as shown. With reference to FIG. 6, a mounting invagination 92 is shown. Mounting invagination 92 is aligned a lower lip 94 of frame 22 (see FIG. 10). Cover unit 26 is then manually adjusted into the closed position and locked as indicated at FIG. 3. Note that the upper invaginations 46 and lower invaginations 48 of element 30 (see FIG. 4) are then aligned to cover snap receptors 90 as shown in FIG. 10. In this fashion, glovebox assembly 20 is used to secure frame 22 so articles on the interior 96 of glovebox are secured and the assembly is locked as shown in FIG. 3.

Figure 2:
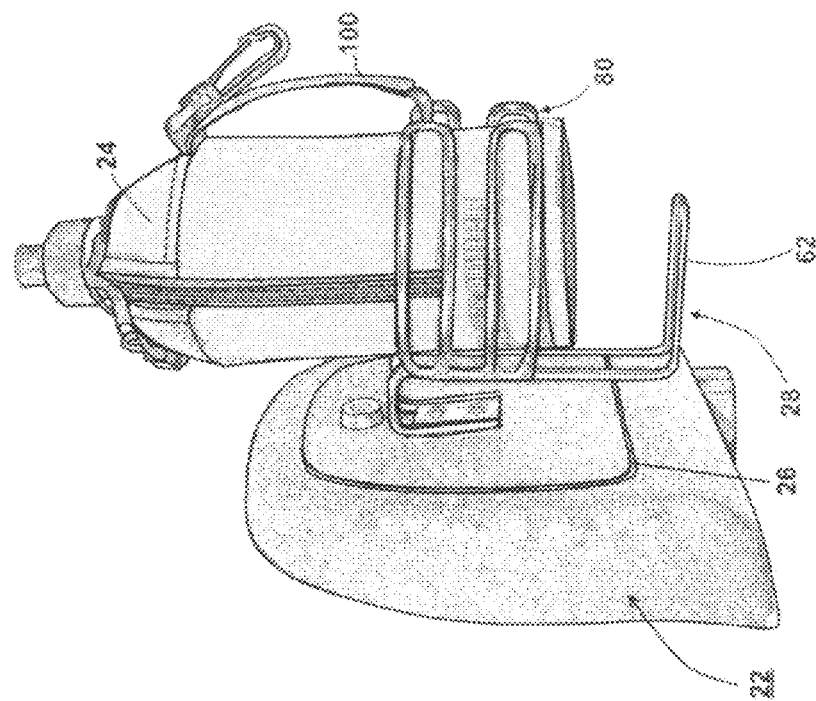
FIG. 2 is the view of FIG. 1, with the drinking bottle partially inserted into an inventive cup holder of the assembly.

During riding a motorcycle rider (not shown) may store a bottle 24 as indicated in FIG. 1. To do this the rider aligns the handle 100 with opening 80 as shown in FIG. 2. Then bottle 24 is simply lowered until bottle 24 comes to rest against floor 62 then rotating handle 100 outside of ribs 64 and 66 (or alternatively 68 and 70) to achieve the secure position as shown in FIG. 1.

To remove the bottle 24 the rider simply reverses rotation of handle 100 as so as to again align handle 100 with opening 80 and then lifting bottle 24 out of cup holder 20. To remove assembly 20, key 36 is simply inserted into keyhole 50 and suitably rotated so that latch 52 is also rotated so as to disengage from upper portions of frame 22 and then cover unit 26 may be opened as shown at FIG. 7. Note that the assembly 20 may also be completely removed and replaced with prior art cover 86. Additionally, it should be noted that cover unit 26 may be manufactured and used without cup holder 28.

It should be apparent that the invention not only accomplishes the major functions required from such systems but does so in a particularly advantageous manner. It should be equally apparent, however, that various minor and equivalent modifications from the embodiments disclosed herein for illustrative purposes could be employed without departing from the essence of the invention. It is to be understood, therefore, that the invention should be regarded as encompassing not only the subject matter literally defined by the claims which follow, but also technical equivalents thereof.

What is claimed is:

1. A cup holder assembly attachable to a motorcycle adapted for rotatable reception of a cup having a handle, the cup holder comprising:
    a glovebox including a lip and at least one snap receptor;
    a glovebox cover for replacing a manufacturer's cover, the glovebox cover including at least one snap invagination;
    a latch on the back of the glovebox cover;
    a flange on the back of the glovebox cover, the flange defining a flange invagination between the flange and the glovebox cover;
    a base adapted for fixed attachment to the glovebox cover, the base including connector elements extending outwardly from the glovebox cover;
    a backrest connected to the connector elements and extending downwardly therefrom;
    a floor extending outwardly from the bottom of the backrest; and
    four ribs connected to the backrest and forming a cylindrical volume in cooperation with the backrest and the floor, wherein portions of the ribs form an opening suitable for downward movement of a cup handle such that a cup may slide downward into the cylindrical volume with the handle being received in the opening between the ribs, and wherein rotating the cup within the cylindrical volume securely engages the handle with at least one of the ribs such that the cup is prevented from sliding upward;
    wherein the glovebox cover attaches to the glovebox with the lip of the glovebox resting inside the flange invagination and a space between the glovebox cover and the latch, and the at least one snap receptor fit within each snap invagination;
    wherein the latch is releasable, allowing complete removal of the glovebox cover from the motorcycle.

2. The cup holder of claim 1 wherein the opening has a horizontal span between ½ and 3 inches.

3. The cup holder of claim 1 wherein the opening has a horizontal span of about 15/16 inches.

4. The cup holder of claim 1 wherein the cylindrical volume has a diameter of 4 inches.

* * * * *